United States Patent Office 3,309,554
Patented Mar. 14, 1967

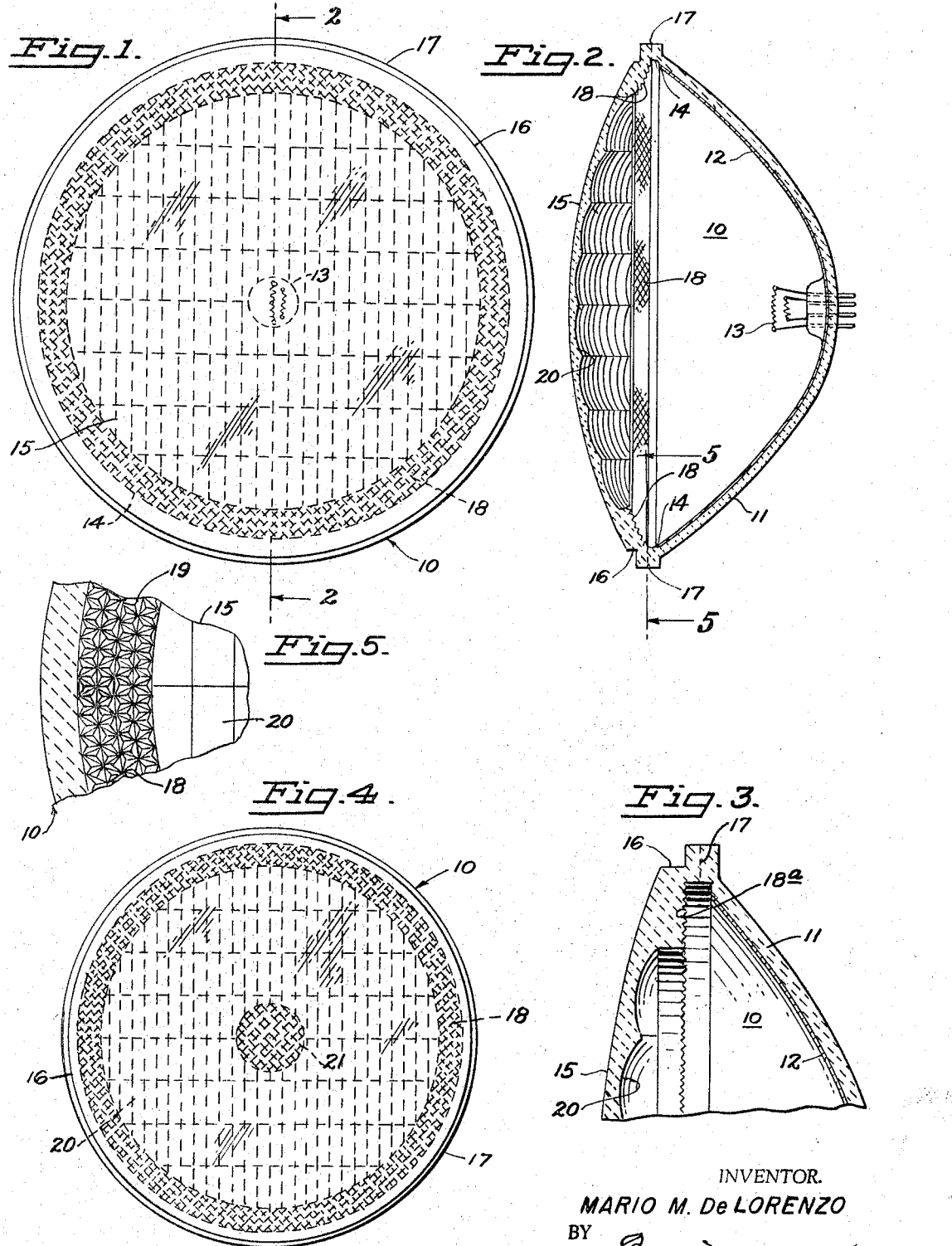

3,309,554
SEALED BEAM HEADLAMPS WITH A
REFLECTIVE SAFETY RING
Mario M. De Lorenzo, San Francisco, Calif.
(P.O. Box 203, Glen Ellen, Calif. 95442)
Filed Sept. 30, 1963, Ser. No. 312,538
4 Claims. (Cl. 313—111)

This invention relates to reflecting signal lamps for vehicles, and more particularly to such reflecting signal devices in so-called sealed-beam electric lamps of automobiles. Such sealed-beam lamps per se are well-known as a hermetically sealed bulbous body having a lens and a somewhat parabolic reflector hermetically sealed at a relatively connecting circumferential edge, and a suitable electric light filament at the axis of principal focus of the parabolic reflector. To differentiate vehicles, the vehicle having, or which should have lamps including the invention, is referred to as the subject vehicle.

The use of electric head lamps and tail lamps in automobiles is universal and the need and utility thereof after dark is self-demonstrating. But there are times in driving conditions after dark when a driver has failed to "turn on" or illuminate his vehicle lights, or when a vehicle is parked after dark with no illuminated lamps. It may also be noted that it is not at all unusual for one or more headlights of an automobile to become extinguished or burned out. All of which phenomena create hazardous driving conditions for an oncoming vehicle approaching a subject vehicle, whether the approaching vehicle be at the rear or at the front of the subject vehicle on which reflecting means of the present invention is or should be mounted. Under such conditions it is manifestly desirable that the driver of such a subject vehicle should be provided with means which will visually establish the presence on the highway of the subject vehicle and thus warn the driver of another approaching vehicle.

Broadly, there have been self-reflecting facilities heretofore incorporated in or accessory to automobile headlights wherein self-reflecting members reflect incident rays from the lamps of an approaching automobile. The present invention is not limited to a particular type of reflecting unit since any reflecting unit may be employed in which a self-focusing reflecting means reflects incident rays of light in the well-known optical formula of reflection at the same angle as the impingement of the incident rays.

An object of the present invention is to provide a reflecting means within a sealed-beam headlight or taillight of vehicles which may be observed by the driver of an approaching vehicle having illuminated headlights, when the lights of the subject vehicle are not illuminated, but the reflection of which will be subdued or eliminated when lamps of subject vehicle are lighted.

A further object is to provide a reflecting means in a seal-beam headlight requiring no additional weight, material, parts, or workmanship, and which may be molded into the inner face of the lens of such a sealed-beam electric lamp so as not to extend radially beyond the limits of the primary reflection of said lamp.

With the foregoing and other objects in view, as will more fully appear herein, preferred forms of the invention are more fully described in the annexed specification and illustrated in the accompanying drawing in which:

FIG. 1 is a front elevation of the invention.
FIG. 2 is a vertical transverse section on line 2—2 of FIG. 1.
FIG. 3 is a fragmentary vertical transverse section of a modified form of the invention.

FIG. 4 is a front elevation of another modified form of the invention.
FIG. 5 is a fragmentary enlarged rear view of lens member on line 5—5 of FIG. 2.

Referring to the drawing in which like reference characters indicate corresponding parts in the several views, and referring firstly to the exemplification in FIGS. 1 and 2, the reference character 10 indicates generally an illuminating lamp for an automobile of a type commonly designated a sealed-beam lamp which comprises a hermetically sealed bulbous body of glass, plastic or the like, having a primary reflector member 11 generally parabolic in section as shown in FIG. 2, and preferably being coated at its inner concave paraboloid surface with a reflecting material 12 such as mercury, as is common and well known. At the vertex or principal focal axis of the reflector there is the usual electric illuminating filament 13 which may be a single filament or a double filament member for respective high beam and low beam facility in the lamp. The forward edge 14 of the parabolic reflector is circular in a plane, as in conventional. The lamp has a transparent or partially transparent lens 15 normally of glass which usually, and preferably, is convex with relation to the concavity of the reflector 11, said lens having a circular periphery 16 congruent with the circular forward edge 14 of the reflector 11. The respective circular congruent edges 14 and 16 of the reflector and the glass lens are fused in an annular integral connecting band 17, thus providing the hermetically sealed bulbous body of a sealed-beam lamp, the interior of which may be deprived of atmospheric air to a desired degree in a well-known manner to provide a partial vacuum, which may be supplemented by injection of a suitable gas into the hermetically sealed bulbous body.

Within the diameter of the forward edge 14 of the primary reflector and adjacent to the inner circumference of the fused connecting band 17, and within the hermetically sealed bulbous body, there is an annular planar band 18 comprising a multiplicity of closely spaced secondary reflecting units 19, said band and units being preferably integrally molded into the circumferential edge portion of the inner face of the lens simultaneously with the molding of the lens, thus eliminating separate operations and material and mechanical parts in manufacture, and providing an integral lens and usual parabolic primary reflector and an annular band of secondary reflecting units encased free of dust and dirt in the hermetically sealed body which may be mounted in the usual lamp cavity or pod provided in the stamped sheet metal bodies of the present day automobile, wherein the opening for the lamp usually fits closely to the circumference of the lens.

The reflecting units 19 of the annular band 18 may be of any suitable shape, such as a plurality of prisms, having reflecting surfaces which have the well-known characteristics of reflection at an angle equal to the angle of incident rays, preferably being a plurality of closely-spaced reflecting surfaces such as may be provided by indentations defined by the three joining relatively right-angled surfaces at the corner of a cubical prism.

It is preferred that the convex lens 15 have a smooth outer convex surface. At its inner surface the central portion of the lens within the diameter of the reflecting band 18, may have diffusing ridges or flutes 20. In the area occupied by the band 18 of the reflecting units 19 the lens body is transparent other than the said reflecting elements 19 which are integral with the inner face of the lens within the bulbous body, and taken as individual surfaces are per se transparent, but taken collectively are translucent with respect to the rays of light from the lamp filament, so that when the lamp filament is lighted, the rays of light therefrom, as reflected by the parabolic reflector surface 12, shines through the area of the entire lens including the translucent secondary reflecting portion 18 and cancels out any reflective effect of incident rays from the lights of an approaching automobile. If, however, the lamps of the subject automobile are not lighted, and an approaching automobile has its headlamps illuminated, the rays of light from such approaching headlamps will be reflected by the annular band of reflecting units 19 and thus provide warning to the driver of the approaching vehicle.

Referring to the modification shown in FIG. 3, it is noted that in the exemplification illustrated in FIG. 2, the reflective band 18 at the circumferential portion of the inner face of the lens, is at an incline to the axis of the principal focus of the lamp, whereas in the modification of FIG. 3 the band of secondary reflective units 18a are in a plane substantially perpendicular to the axis of the principal focus of primary reflector 11, such normal positioning of the band of units 18a more nearly approaching auto-collimation of reflected rays in accordance with the thesis of reflected rays being reflected at the same angle as impingement of incident rays. In other respects the structure of the device of FIG. 3 may be similar to that shown in FIGS. 1 and 2.

In the modification of FIG. 4 all structural elements in the lamp of FIGS. 1 and 2 may be included or optionally, including FIG. 3. In this modification it is preferred that in addition to the secondary reflecting annular band 18 (or 18a of FIG. 3) there shall also be a central integrally molded disc 21 at the axial center of the lens, the inner face of which may have a plurality of secondary reflecting units or surfaces 19a similar to reflecting units 19. Such central reflecting disc 21 may partially obscure the glare of the lighting element 13 but perform the same secondary reflector function as the annular band of reflecting units 19.

Having described the invention, what is claimed as new and patentable is:

1. A lamp for vehicles comprising a hermetically sealed bulbous body, a parabolic primary reflector including a vertex providing a principal focus of said reflector at one axial end thereof, said reflector having at its opposite axial end an outer circumferential edge portion, a source of light means at the principal focus of said reflector at said one axial end thereof, a lens closing said opposite axial end of the primary parabolic reflector and integrally sealed thereto at its circumferential edge portion providing said hermetically sealed bulbous body, said lens having a smooth outer face and having an annular planar band at a circumferential edge portion of its inner face, said band having a multipilicity of self-focusing secondary reflector units integral with the inner face of said lens and protectively encased within said bulbous body and within the diameter of the plane of said outer circumferential edge portion of said primary reflector, the area of the lens within said band being at least partially permeable by rays of said light source.

2. A vehicle lamp as set forth in claim 1, and in which the inner face of said lens has light-diffusing flutes over the central portion within the diameter of said annular band of the secondary reflector units.

3. An automobile lamp as set forth in claim 1, and in which the inner face of the lens is convex in its central portion within the diameter of said annular band, and said band of self-focusing secondary reflector units is integral with the inner face of said lens and is substantially perpendicular to the axis of the lens and the principal focus of said primary reflector.

4. A vehicle lamp as set forth in claim 1, in which said lens is of normally transparent material which is rendered translucent by said collective reflective units in the area of said annular band of secondary reflecting units.

References Cited by the Examiner
UNITED STATES PATENTS

| | | | |
|---|---|---|---|
| 1,671,086 | 5/1928 | Stimson | 88—78 |
| 1,751,070 | 3/1930 | Boots et al. | 240—7.1 |
| 2,597,681 | 5/1952 | Smith | 313—113 |
| 2,744,210 | 5/1956 | Ferguson | 313—116 X |
| 3,119,894 | 1/1964 | Nagel et al. | 240—106.1 X |

JAMES W. LAWRENCE, *Primary Examiner.*

GEORGE N. WESTBY, *Examiner.*

C. R. CAMPBELL, *Assistant Examiner.*